(12) United States Patent
Pinheiro

(10) Patent No.: US 8,106,794 B2
(45) Date of Patent: Jan. 31, 2012

(54) METHOD AND DEVICE FOR DISPLAYING FORECASTS ON A NAVIGATION PLAN

(75) Inventor: Jean-Philippe Pinheiro, Toulouse (FR)

(73) Assignee: Thales (FR)

( * ) Notice: Subject to any disclaimer, the term of this patent is extended or adjusted under 35 U.S.C. 154(b) by 576 days.

(21) Appl. No.: 12/257,726

(22) Filed: Oct. 24, 2008

(65) Prior Publication Data

US 2009/0109065 A1   Apr. 30, 2009

(30) Foreign Application Priority Data

Oct. 26, 2007  (FR) ...................................... 07 07560

(51) Int. Cl.
*G01C 21/00* (2006.01)
(52) U.S. Cl. .......................... 340/971; 340/945; 345/629
(58) Field of Classification Search .................. 340/971, 340/945
See application file for complete search history.

(56) References Cited

U.S. PATENT DOCUMENTS

| 7,010,398 | B2 * | 3/2006 | Wilkins et al. ..................... 701/3 |
| 7,254,481 | B2 * | 8/2007 | Yamada et al. ................ 701/208 |
| 2003/0071828 | A1 | 4/2003 | Wilkins, Jr. et al. |
| 2005/0149254 | A1 * | 7/2005 | Yamada et al. ................ 701/202 |
| 2008/0027594 | A1 * | 1/2008 | Jump et al. ........................ 701/11 |
| 2008/0036778 | A1 * | 2/2008 | Sheha et al. ................... 345/502 |
| 2009/0094084 | A1 * | 4/2009 | Rempel et al. ...................... 705/8 |

FOREIGN PATENT DOCUMENTS

| EP | 1245929 | 10/2002 |
| FR | 2897975 | 8/2007 |
| WO | WO0125727 | 4/2001 |
| WO | WO2005101055 | 10/2005 |

* cited by examiner

*Primary Examiner* — Jennifer Mehmood
*Assistant Examiner* — Naomi Small
(74) *Attorney, Agent, or Firm* — Lowe Hauptman Ham & Berner, LLP

(57) ABSTRACT

The invention applies particularly to the method and device for displaying forecasts on the flight plan of an aircraft. The method includes representing the craft by a first symbol in its current position and by a second symbol in its future position, modifying the position of the second symbol on the navigation plan in order to change it to a future position, displaying on the viewing screen the first symbol and at the same time the second symbol representing the craft on the navigation plan in a future position and displaying on the viewing screen the navigation data at the instant of the future position of the craft.

15 Claims, 4 Drawing Sheets

METHOD AND DEVICE FOR DISPLAYING FORECASTS ON A NAVIGATION PLAN

RELATED APPLICATIONS

The present application is based on, and claims priority from, French Application Number 0707560, filed Oct. 26, 2007, the disclosure of which is hereby incorporated by reference herein in its entirety.

BACKGROUND OF THE INVENTION

1. Field of the Invention

The field of the invention is that of aircraft flight plan displays or air traffic control station displays. It more generally concerns the devices and methods for displaying navigation plans for all types of craft (airborne, seaborne, terrestrial and spaceborne).

2. Description of the Related Art

It will be recalled that an aircraft is equipped with a navigation aid system called FMS, an acronym that stands for Flight Management System. The latter communicates with other external systems and systems on board the aircraft. The navigating crew communicates with the FMS via human-machine interfaces (HMI) having viewing screens and means of controlling and pointing to elements displayed on the viewing screen. The navigation aid system assists the crew in programming the flight plan before take-off and in following the flight plan, from take-off to landing. Its displays, on one of the viewing screens that form the cockpit, the flight plan of the aeroplane. This screen is called "navigation display". More and more systems make it possible to make forecasts. Such is the case, for example, of the weather radar in an aeroplane cockpit or of the aeroplane flight path computer in a control station or an air traffic control station. Weather radars are these days capable of supplying information in real time to the FMS concerning the intensity or the location of bad weather facing the aeroplane. More generally, the different forecasting computers have the capability to give information concerning the external environment likely to interfere with the navigation plan of the craft. Furthermore, it is possible with these different computers to display, for example, future data concerning the surrounding air traffic, the weather and zones for changing communication frequency that occur along the flight plan. In order to facilitate understanding the future situation, the latter must be displayed in the same format as the current situation. This prerequisite therefore requires a display co-located on the "Navigation Display". Unfortunately, this display can induce human errors if the user interprets the future situation as being the current situation. For example, in the case of the display of the future air traffic, the user may understand that another aircraft is close to collision whereas the latter will reach that position only sometime later. The major issue is to find a display method that avoids any possibility of wrongly interpreting the forecasts and renders the presentation of the information as clear as possible.

Systems are known, as described in patent WO-A1-2005101055, that use, for example, weather forecasting computers coupled to the flight plan computer of an aeroplane. This system performs calculations to correlate the flight plan with weather forecasts and issues alarms in case of serious dangers. This system only performs calculations and initiates alarms. Now, the new forecasting systems can offer the pilots more forecasting services, to display the changing flight plan. It is a good thing, for example, for a pilot to be able to view the changes to the external environment in the vicinity of his flight plan and, above all, in addition, for all the data to be accessible by the databases and the various computers on board the aeroplane. To exploit the forecasting computers, it is essential to put in place a display method that makes it possible to use its forecasting data. It is mandatory for this method to facilitate the interpretation of the data without risk of ambiguity with the data of a current situation.

SUMMARY OF THE INVENTION

More specifically, the subject of the invention is a method of displaying a navigation plan for a craft by a display device comprising a display system, at least one viewing screen, a means of calculating the navigation plan of the craft, at least one source of navigation data and a pointing means engaging and deactivating a selection function, characterized in that the system handles the following functions:

When the selection function is inactive, the system displays on a viewing screen the navigation plan of the craft, the current position of the craft on the navigation plan and navigation data at the instant of the current position of the craft, its current position being represented by a first symbol;

When a user selects the symbol representing the craft on the navigation plan and keeps the selection function active, the system initially creates a second symbol representing the craft, this symbol sliding along the navigation plan by means of a pointer. When the user then modifies the position of the second symbol on the navigation plan in order to change it to a future position, the system displays on the viewing screen the first symbol and at the same time the second symbol representing the craft on the navigation plan in a future position and in addition displays the navigation data at the instant of the future position of the craft.

The invention is noteworthy in that the system uses the navigation plan as a temporal scale to display the forecast data originating from the various computers. Thus, the display of the forecasts is obtained by displacing a symbol along the planned route of the craft. This solution makes it possible to easily view the movement of the craft.

The cockpits now include pointing means intended for their viewing screens, of the same type as those commonly found in the computer domain. Advantageously, the selection is activated by an action on the pointing means and remains active as long as this action is maintained. Furthermore, it is necessary to make the user aware that the displayed data is forecast data. To avoid any interpretation error, the invention uses the "constrained human-machine interface (HMI)" concept. This means that, to view forecast data, the user is obliged to perform an action that makes him aware that he is viewing a future situation. Furthermore, immediately he stops this action, the system returns to the display of the current situation. Thus, when the pilot returns to this screen a little time later, he may not find a future situation of the flight plan still displayed on his viewing screen. Thanks to this method, interpretation errors due to the fact that the pilot might have forgotten that he asked the system to display a future situation are avoided.

Advantageously, the navigation plan and the first symbol are displayed permanently, this first symbol being fixed on the viewing screen. Furthermore, the position of the second symbol changes according to the navigation plan, this second symbol being displayed only when it is selected. In practice, it is necessary to display on the screen both symbols, the first fixed and the second moving on the flight plan plotted on the screen. The first symbol thus gives a temporal and spatial reference point and the moving second symbol on the flight plan makes it possible to view the changes to the situation from this reference. This method displaying the origin point with future information makes it possible to ensure that the user will correctly analyse the situation.

Advantageously, the second symbol is superimposed on the first when it is positioned on the current position and is different from the first symbol. When the user activates the selection, it is necessary for him to be able to recognize this, so the second symbol is such that it is visible when the two symbols are superimposed. In one exemplary representation, the second symbol is a form of framed aeroplane, the whole in broken lines whereas the current situation is shown by solid lines without the frame. This form refers in a way to a temporary target so making it possible to show that it is a projection or an objective to be reached and that it is not a certain situation. It is, in practice, important to use the references that the human mind interprets as forecasts.

Advantageously, the display system can represent the navigation plan and the navigation data according to two perspectives: a top view and a lateral view. The pilot thus has visibility of the situation of the aeroplane in all four dimensions: the three spatial axes and the time dimension. In this way, the method provides an important aid to the decision to manoeuvre the aircraft. It is also possible to imagine using the method in a three-dimensional plan, a perspective closer to the situation seen by the pilot.

The present invention also relates to a device for displaying a navigation plan of a craft comprising a display system, at least one viewing screen, a means of calculating the navigation plan of the craft and at least one source of navigation data of a current position. Advantageously, it also comprises a first pointing means for the display to modify the position of the craft on the navigation plan and at least one second means for calculating future navigation data such that:

Said display system presents on the viewing screen the craft on the navigation plan by a first symbol in the current position and by a second symbol in a future position, the position of the symbol being modified on the navigation plan with the pointing means;

Said means of calculating the navigation plan supplies data concerning the temporal position of the craft on the navigation plan to at least one means of calculating future navigation data;

Said display system presents on the viewing screen the future navigation data corresponding to the instant of the position of the craft on the navigation plan.

The invention can, if necessary, be applied to any craft comprising a navigation aid system such as ships or motor vehicles. More particularly, the invention will be applied to an aircraft comprising the device according to the invention implementing the method according to the invention. Advantageously, the means of calculating a navigation plan is a flight plan aid system. Since aircraft move at speeds far greater than other types of craft, the flight decisions need to be taken more rapidly and errors can have serious consequences. The invention makes it possible to facilitate the decision-making process thanks to a display method presenting the information clearly.

Preferably, in a first embodiment, one of the means of calculating future navigation data is a weather forecasting computer. In practice, the pilot exploits the invention particularly with this type of forecasting computer coupled to his flight plan computer because only the weather environment cannot be controlled or anticipated in the long term.

It is also possible, in a second embodiment, for one of the means of calculating future navigation data to be an aircraft flight path computer. In addition to the weather data, the pilot has the trend of the flight paths of the aeroplanes in the vicinity of his flight plan. In the case where he has to make a change of flight plan in order to avoid an area because of difficult weather conditions, he can easily view the position and the flight path of the other aeroplanes in the vicinity of the change-of-heading area. He thus has a clear vision of a future situation with the trend of the various surrounding parameters and can take good decisions quickly. In addition, manipulation is easy; the pilot simply has to select his aeroplane and move it on the flight plan by sliding the symbol using a cursor.

An aircraft has on board multiple computation devices or databases concerning the external environment. The invention makes it possible to exploit all its means. For example, in the course of its flight plan, the aeroplane passes through different communication frequency zones. The invention makes it possible to display on the flight plan the changes of these communication zones and the moment when it is necessary to change frequency. The invention also makes it possible to take as data source the navigation management system of the aircraft. The pilot therefore has the possibility of displaying the remaining fuel at a given time in the flight plan for example. The invention can also be applied to an air traffic control station comprising the device and implementing the method according to the invention. In practice, an air traffic control station operator may need to view the trend of different aeroplane positions.

The method of displaying forecasting data according to the invention is advantageous because the analysis of the forecast data is enhanced thanks to a display produced according to a presentation enabling an instinctive understanding of the situation. Moreover, the method is simple to use, and a user adopts it from first use. Regarding safety issues, the "constrained HMI" ensures that the user is aware that he is viewing a future situation without mistaking it for the current situation. Finally, the means for implementing the method are generally already present on latest-generation aeroplanes.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
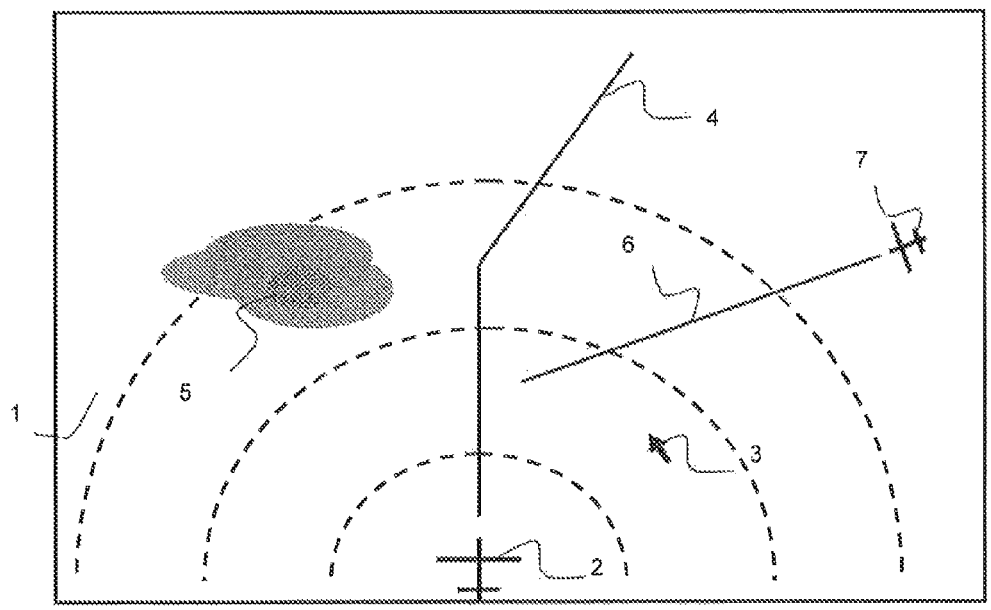
FIG. 1 represents the "navigation display" of an aeroplane presenting the weather environment and air traffic in the vicinity of the flight plan.

As a non-limiting example, the invention is applied according to FIG. 1 to the "navigation display" 1 of an aeroplane.

Figure 2:
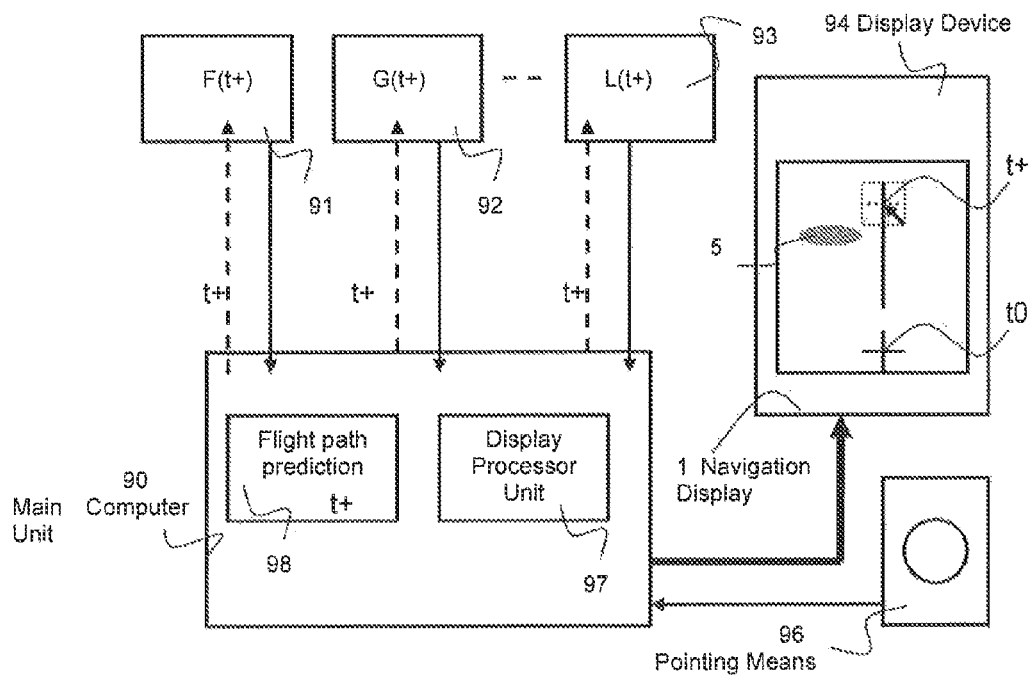
FIG. 2 represents the functional diagram of the device according to the invention.

This display shows the flight plan 4 of the aeroplane 2. Today, these systems have a cursor 3 controlled by a pointing means 96, a function represented in FIG. 2. The display systems are generally associated with a graphic generation function 97 making it possible to present on the navigation display 1 of a display device 94 forecast data obtained from functions of forecasting computers 91, 92, 93. The invention can use any forecasting computer that would be used to display, on the navigation plan, weather forecasts, the state of the traffic, the terrain, the remaining fuel or communication frequency zones. In our example, it is a representation 5 of the weather forecasts obtained from the computer 91 handling a function F(t) taking as input parameter a date t+ generated by the flight plan computer 98, t+ being the date of the future position of the aeroplane 2 on the navigation plan 4. The "navigation display" also presents on the screen the state of the surrounding air traffic, with, in this example, an aeroplane 7 and its flight plan 6. This data is obtained from the forecasting computer 92 in FIG. 2 handling a function G(t) having as one of the input parameters a date t+ generated by the flight plan computer 98. All of the forecasting data obtained by the functions F(t), G(t) and the data from the flight plan computer are coupled together by a main computation unit 90, the FMS. All of this data is then displayed on the navigation display 1 by the graphic generation function 97. The symbol 3 represents the aeroplane in the current position. In this example, it is implemented in solid lines and is fixed at the bottom of the screen. The navigation plan 4 is represented by a solid line.

Figure 3:
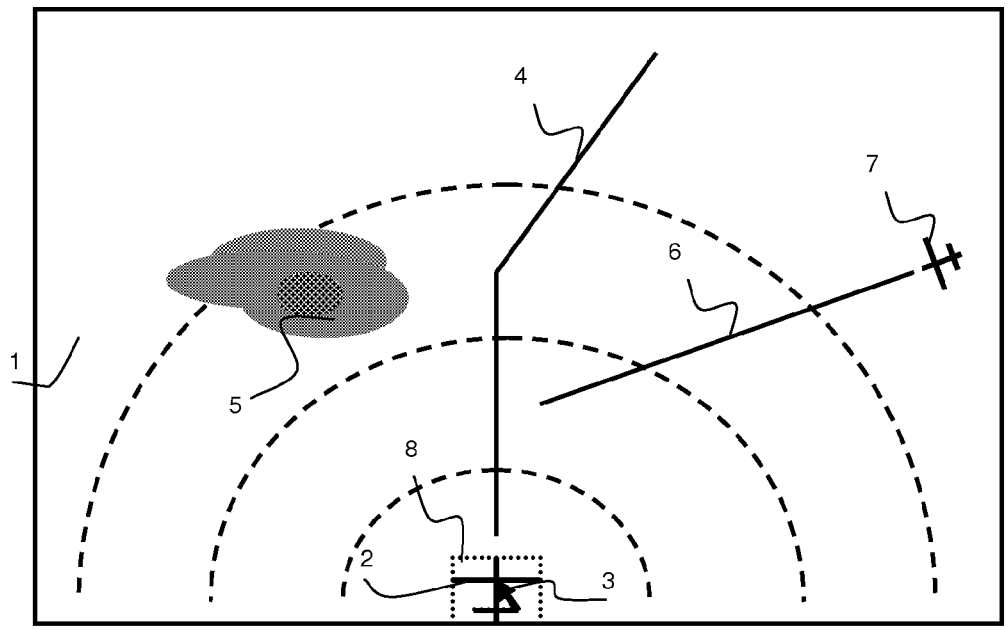
FIG. 3 represents the engaging of the method of displaying forecasting data.
Figure 4:
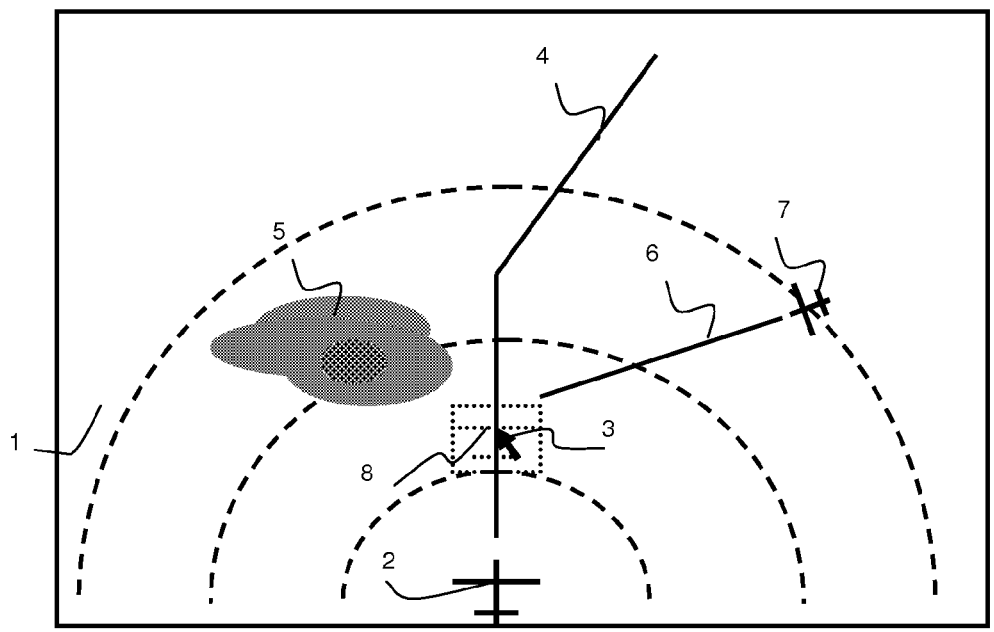
FIGS. 4 and 5 represent the display of the forecasting data for two future positions of the aeroplane on the flight plan.
Figure 5:
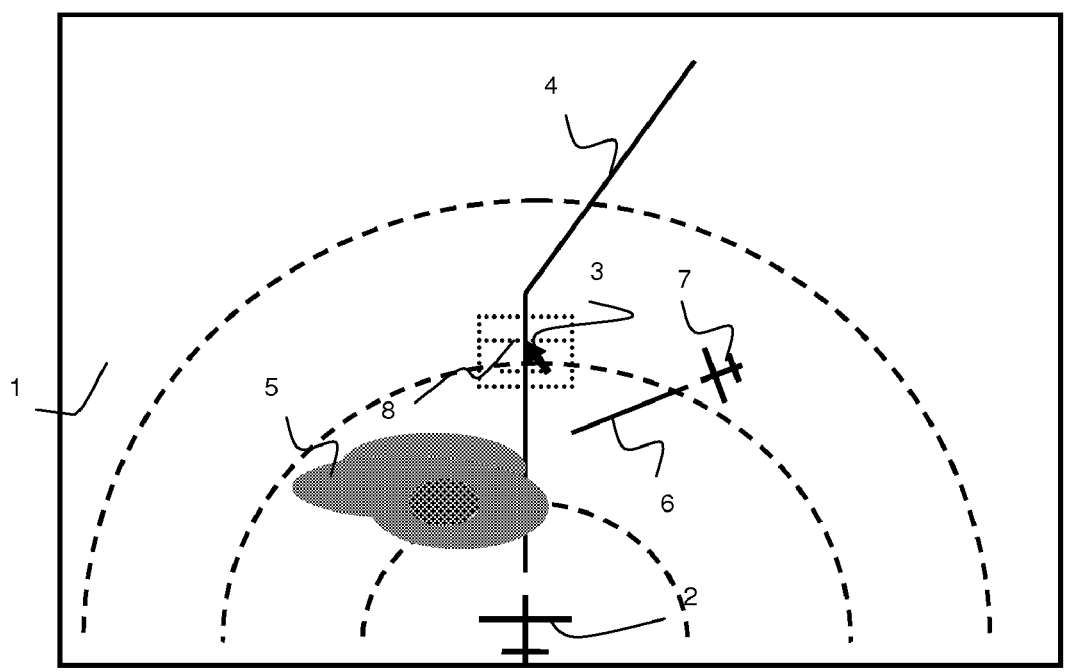

FIG. 3 represents the "navigation display" at the moment when the cursor is moved over the symbol representing the aeroplane and when the user performs an action on the pointing means 96 to select the symbol 2. Once the selection function is active, a second symbol 8 is created. It is the same symbol as the symbol 2, apart from the fact that it is implemented in broken lines and framed by a broken-line rectangle. This representation is intended to suggest to the user that it is a forecast object and not real. This enables the user to be aware that the aeroplane is in a situation which is not that of the current situation. The form of the second symbol 8 different from the first symbol 2 makes it possible to distinguish the two symbols when these two symbols are superimposed. In this position, the data displayed 5, 6 and 7 is that of the current situation. In practice, the flight plan computer supplies to the various forecasting computers as input parameter the date of the current situation, the second symbol being positioned on the current situation of the aeroplane. For the second symbol to remain present on the screen, it is necessary for the user to maintain the selection action on the pointing means 96. FIG. 4 represents the second symbol 8 in a future situation, the first symbol 2 remaining at the bottom of the screen in the current situation of the aeroplane on the navigation plan. The position of the second symbol on the navigation plan 4 can be modified using the pointing means 96 indicated on the screen by the cursor 3. The second symbol can be moved along the navigation plan. At each position of the second symbol on the navigation plan there is a corresponding date t+. This date is entered as parameter in the forecast calculation functions 91, 92, 93. These computers supply future data which is displayed on the navigation display 1 by the graphic generation function 97. At a position t+, the surrounding elements 5, 6 and 7 have changed value relative to the current position of the aeroplane on the navigation plan. The element 5 represents bad weather and the elements 6 and 7 respectively represent an aircraft nearby and its flight plan. When the selection is maintained by the cursor 3 on the second symbol 8, the navigation screen shows a future situation of the environment relative to the situation of the aeroplane represented by the second symbol 8 on the flight plan. If the user does not maintain his action on the pointing means, the display then returns to the configuration according to FIG. 1. This is part of the "constrained HMI" concept thus preventing the viewing screen from presenting a future situation without action on the part of the user. FIG. 5 represents the display of the "navigation display" at a second future position of the second symbol. The user has moved the aeroplane on the flight plan in order to view the trend of the bad weather 5 and of the aeroplane 7. By moving the cursor on the flight plan, he thus views an animated simulation of the environment. In this example, he wished to know if the approaching bad weather would hamper the flight and, at the same time, if there was a need to modify the flight plan, to which direction it would be preferable to reconfigure his flight plan without risking a collision with the aeroplane 7. By thus gradually varying the symbol 8 along the flight plan, the pilot is aware that he is viewing a future situation and, moreover, he has a clear simulation of the trend of the situation. He is in a position to rapidly analyse the situation and take appropriate decisions faced with a potential danger. It is particularly simple to manipulate.

Figure 6A:
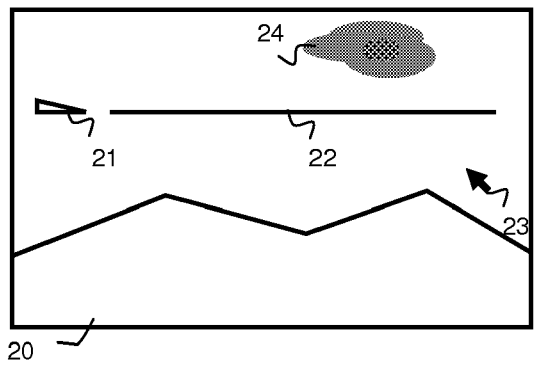
FIGS. 6a, 6b and 6c represent the "navigation display" according to a lateral view.
Figure 6B:
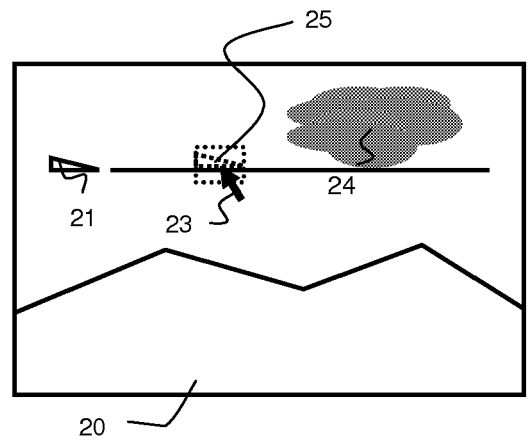
Figure 6C:
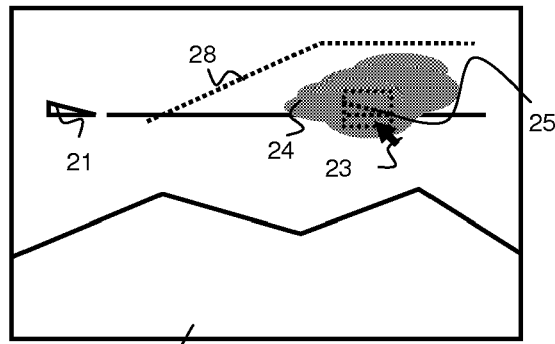

FIGS. 6a, 6b and 6c represent the temporal trend of a lateral plan of the flight plan 22 of an aeroplane 21. The trend of these various figures indicates to the pilot that the aeroplane will cross bad weather 24 in the continuation of the flight. In FIG. 6c, the symbol 25 of the aeroplane is situated in the middle of the danger 24. By advancing the symbol 25 representing his aeroplane on the flight plan, the pilot sees that the aeroplane is heading directly for the heart of the bad weather 24. He similarly views the path of the danger relative to that of his aeroplane and therefore has the necessary information to decide which change of flight plan to put in place. In the case of FIG. 6, the pilot thus has the possibility to view the location and the path of the danger 24 on his flight plan. He then reprograms the flight path of his aeroplane and defines a new flight plan 28 to avoid the danger 24 by a certain climb angle.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method of displaying a navigation plan for a craft by a display device comprising a display system, at least one viewing screen, means for calculating the navigation plan of the craft, at least one navigation data forecasting computer and pointing means engaging and deactivating a selection function, the display system representing on the viewing screen the craft on the navigation plan and the navigation data at an instant of the future position of the craft, the system uses the navigation plan as a time scale by enabling the craft to move on the navigation plan to display the forecast data from the computers and handles the following functions:

when a user selects the symbol representing the craft on the navigation plan at its current position and keeps the selection function active, the system initially creates a second symbol representing the craft, this symbol sliding along the navigation plan by means of a pointer, and when the user modifies the position of the second symbol on the navigation plan in order to change it to a future position, the system displays on the viewing screen the first symbol, the second symbol representing the craft on the navigation plan in the future position and the navigation data at the instant of the future position of the craft.

2. The method according to claim 1, wherein the navigation plan and the first symbol are displayed permanently, this first symbol being fixed on the display screen.

3. The method according to claim 2, wherein the position of the second symbol changes according to the navigation plan, this second symbol being displayed only when it is selected.

4. The method according to claim 3, wherein the second symbol is superimposed on the first symbol when it is positioned on the current position and is different from the first symbol.

5. The method according to claim 4, wherein the second symbol is a form of framed aeroplane, the whole in broken lines.

6. The method according to claim 5, wherein the display system can represent the navigation plan and the navigation data according to two perspectives: a top view and a lateral view.

7. A device for displaying a navigation plan of a craft comprising:
a display system;
at least one viewing screen;
means for calculating the navigation plan of the craft;
at least one navigation data forecasting computer; and
pointing means engaging and deactivating a selection function, the pointing means is means for modifying a current position of the craft on the navigation plan,
wherein
said display system represents on the viewing screen the craft on the navigation plan by a first symbol in the current position and by a second symbol in a future position;
said second symbol is initially created by the system when said first symbol is selected and the selection function is kept active;
said second symbol is slidable along the navigation plan by said pointing means;
said means for calculating the navigation plan supplies data concerning a temporal position of the craft represented by the second symbol on the navigation plan to at least one forecasting computer;
said display system presents on the viewing screen the future navigation data corresponding to an instant position of the craft represented by the second symbol on the navigation plan.

8. The device according to claim 7, wherein a forecasting computer is a weather forecasting computer.

9. The device according to claim 8, wherein a forecasting computer is an aircraft flight path computer.

10. The device according to claim 9, wherein the means of calculating the navigation plan is a flight plan aid system of an aircraft.

11. The device according to claim 10, wherein a forecasting computer is a navigation management system of the craft.

12. An aircraft, comprising a device according to claim 7.

13. An aircraft comprising the device that implements the method according to claim 1.

14. An air traffic control station, comprising a device according to claim 7.

15. An air traffic control station comprising the device which implements the method according to claim 1.

* * * * *